United States Patent
Puri et al.

(10) Patent No.: US 8,284,703 B2
(45) Date of Patent: Oct. 9, 2012

(54) SCHEDULING AND TRANSMITTING UPLINK PACKETS WITHIN UPLINK SUB-FRAMES OF A WIRELESS SYSTEM

(75) Inventors: Anuj Puri, Santa Clara, CA (US); Manish Airy, Santa Clara, CA (US); Amar Prakash Azad, Santa Clara, CA (US); Arogyaswami Paulraj, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 1063 days.

(21) Appl. No.: 11/804,201

(22) Filed: May 17, 2007

(65) Prior Publication Data

US 2008/0285511 A1 Nov. 20, 2008

(51) Int. Cl.
*H04J 3/24* (2006.01)
(52) U.S. Cl. .................. 370/310; 370/473; 370/476
(58) Field of Classification Search .................. None
See application file for complete search history.

(56) References Cited

U.S. PATENT DOCUMENTS

| | | | |
|---|---|---|---|
| 2001/0028638 A1 * | 10/2001 | Walton et al. ................. | 370/335 |
| 2002/0055356 A1 | 5/2002 | Dulin et al. | |
| 2003/0169769 A1 | 9/2003 | Ho et al. | |
| 2005/0018638 A1 * | 1/2005 | Lindskog et al. ............. | 370/338 |
| 2005/0265477 A1 | 12/2005 | Takeda et al. | |
| 2006/0245384 A1 * | 11/2006 | Talukdar et al. ............. | 370/310 |
| 2006/0285505 A1 * | 12/2006 | Cho et al. ....................... | 370/254 |
| 2008/0037547 A1 * | 2/2008 | Jang ............................... | 370/394 |
| 2010/0098027 A1 * | 4/2010 | Gupta et al. .................. | 370/331 |
| 2010/0118829 A1 * | 5/2010 | Lin et al. ...................... | 370/330 |

* cited by examiner

*Primary Examiner* — Kevin C Harper
(74) *Attorney, Agent, or Firm* — Sterne Kessler Goldstein & Fox PLLC

(57) ABSTRACT

A method and apparatus of scheduling and transmitting uplink packets within uplink sub-frames of a wireless system is disclosed. The method includes determining a size of a standard data unit, and determining if the standard data unit can be transmitted within a single sub-channel of an uplink frame by comparing the size of the standard data unit with a number of bits that can be transmitted within the uplink frame as determined by an uplink quality. If the standard data unit is too large to be transmitted within a single sub-channel of an uplink frame, then the standard data unit is divided into sub-data units. The sub-data units are transmitted over multiple uplink frames.

22 Claims, 8 Drawing Sheets

| Generic MAC Header (6 bytes) 210 | Extended Sub-Headers 220 | PN (for encryption) (4 Bytes) 230 | Encrypted Payload 240 | Ciphertext Message Authen-tication (8 bytes) 250 | CRC (4 bytes) 260 |

FIGURE 2

| MCS Scheme | Bytes per Slot | Bytes Carried in 5 Slots |
|---|---|---|
| QPSK, 1/12 | 1.0 | 5.0 |
| QPSK, 1/8 | 1.5 | 7.5 |
| QPSK, 1/4 | 3.0 | 15.0 |
| QPSK, 1/2 | 6.0 | 30.0 |
| QPSK, 3/4 | 9.0 | 45.0 |
| 16-QAM, 1/2 | 12.0 | 60.0 |
| 16-QAM, 3/4 | 18.0 | 90.0 |
| 64-QAM, 1/2 | 18.0 | 90.0 |
| 64-QAM, 3/4 | 27.0 | 135.0 |

FIGURE 4

SCHEDULING AND TRANSMITTING UPLINK PACKETS WITHIN UPLINK SUB-FRAMES OF A WIRELESS SYSTEM

FIELD OF THE DESCRIBED EMBODIMENTS

The described embodiments relate generally to wireless communications. More particularly, the described embodiments relate to a method and apparatus for scheduling and transmitting uplink packets within uplink sub-frames of a wireless system.

BACKGROUND

Wireless communication protocols typically define how wireless data is to be transmitted. A transmission parameter that can be standardized is the minimum size data unit that can be transmitted. Another transmission parameter can be standardized is scheduling for downlink (base station to subscriber) and uplink (subscriber to base station) transmission. Typically, the scheduling generally determines how and when the minimum size data unit is transmitted between the base station and the subscriber.

Wireless network are subject to environmental influences that can cause the quality of links between base stations and subscribers to vary greatly. Generally, as wireless link quality decreases, the order of modulation of transmission signals must decrease, and the level of coding must increase. Therefore, for poor wireless links, the minimum size data units may not fit within a scheduled uplink or downlink frame.

Mobile wireless systems generally include link qualities that vary more than non-mobile wireless systems. Therefore, mobile wireless systems, such as mobile WiMAX systems, can require additional coordination of signal transmission between base stations and subscribers.

It is desirable to provide coordination of uplink transmission of WiMAX standard packets through poor quality uplinks.

SUMMARY

An embodiment includes a method of scheduling and transmitting of uplink packets within uplink sub-frames of a wireless system. The method includes determining a size of a standard data unit. A number of bits that can be transmitted within each of a plurality of slots contained within a single sub-channel is determined based on a quality of the uplink. A determination of whether the standard data unit can be transmitted within a single sub-channel of an uplink frame is made by comparing the size of the standard data unit with the number of bits that can be transmitted within the sub-channel of the uplink frame based on the determined number of bits capable of being transmitted within each slot. If the standard data unit is too large to be transmitted within a single sub-channel of an uplink frame, then the standard data unit is divided into sub-data units. The sub-data units are transmitted over multiple uplink frames.

Another embodiment includes a method of a wireless system scheduling and transmitting of uplink packets within uplink sub-frames of a wireless system. The method includes a base station of the wireless system providing a size of a standard data unit. A number of bits that can be transmitted within each of a plurality of slots contained within a single sub-channel is determined by an uplink quality. Whether the standard data unit can be transmitted within a single sub-channel of the uplink sub-frames is determined by comparing the size of the standard data unit with the number of bits that can be transmitted within the sub-channel of the uplink sub-frame based on the determined number of bits capable of being transmitted within each slot. If the standard data unit is too large to be transmitted within a single sub-channel of an uplink sub-frame, then the standard data unit is divided into sub-data units. A subscriber unit transmits the sub-data units over multiple uplink sub-frames.

Another embodiment includes another method of a wireless subscriber scheduling and transmitting of uplink packets within uplink sub-frames of a wireless system. The method includes determining a size of a standard data unit. Whether the standard data unit can be transmitted within a single sub-channel of an uplink sub-frame is determined by comparing the size of the standard data unit with a number of bits that can be transmitted within the sub-channel of the uplink sub-frame as determined by an uplink quality. If the standard data unit is too large to be transmitted within a single sub-channel of an uplink sub-frame, then the standard data unit is divided into sub-data units. The sub-data units are transmitted over at least one of multiple sub-channels of a single uplink sub-frame, or over multiple uplink sub-frames.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 2 shows an example of a standard WiMAX data unit.

FIG. 4 is a table showing modulation formats, bytes per symbol slot, and the corresponding number of bytes that can be transmitted in five uplink slots.

DETAILED DESCRIPTION

Embodiments of methods and apparatuses for scheduling uplink transmission between a base station and a subscriber are described. The embodiments can include varying levels of transmission signal power, or varying levels of processing power.

Figure 1:
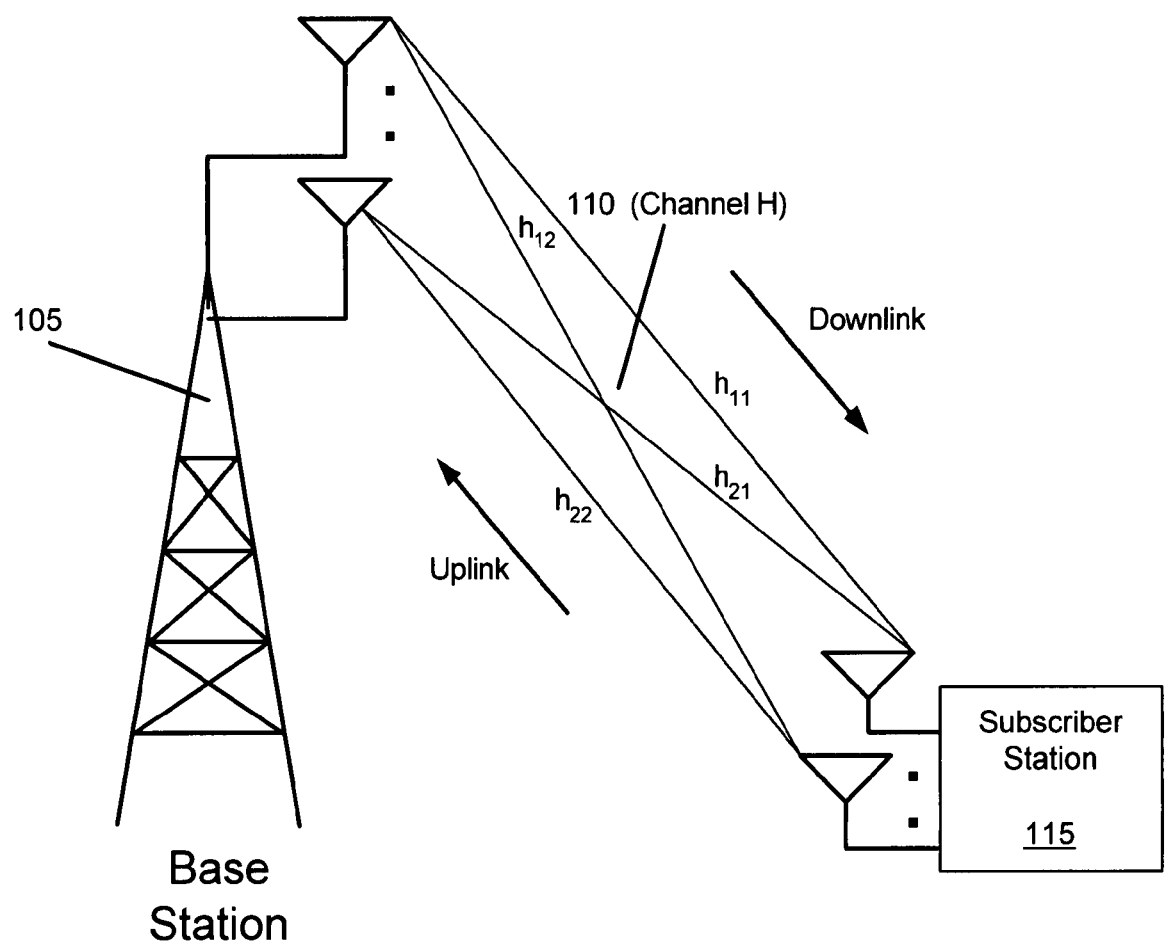
FIG. 1 shows a WiMAX base station communicating with a subscriber through an uplink and a downlink.

FIG. 1 shows a WiMAX base station 105 communicating with a subscriber 115 through a channel (H) 110, that includes an uplink and a downlink. WiMAX protocol communication includes standard transmission protocols, such as, a MAC (media access control) PDU (protocol data unit). The uplink transmission can be between a subscriber and a single base station, or as will be described, between a subscriber and multiple base stations. The base station 105 and the subscriber 115 are shown with multiple antennas. Some of the embodiments described utilize the multiple antennas, while other embodiments do not utilize the multiple antennas.

FIG. 2 shows an example of a standard WiMAX data unit. The WiMAX data unit, generally referred to as the MAC PDU may include a MAC header 210, a sub-header 220, encryption 230, encrypted payload 240, ciphertext message authentication 250 and a CRC (cyclic redundancy check) 260. The size of an exemplary MAC PDU is 22 bytes plus an additional number of bytes as determined by the data payload size. With payload, the MAC PDU can typically include 30 to 60 bytes depending upon the size of the payload.

Figure 3:
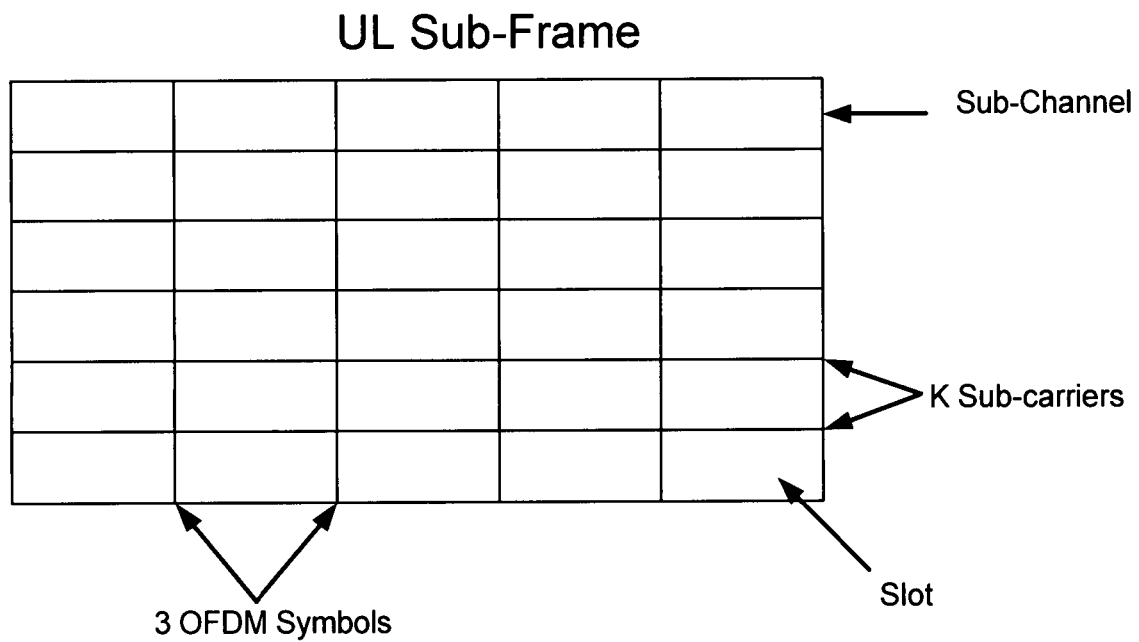
FIG. 3 shows an example of an uplink frame including sub-channels and time slots.

FIG. 3 shows an example of an uplink frame including sub-channels and time slots. In 802.16e OFDMA systems, several OFDM symbols may be dedicated for uplink transmission. In a PUSC mode in 802.16e OFDMA, an uplink slot is composed of 1 sub-channel and 3 OFDMA symbols. That is, 15 symbols occupy 5 slots, which correspond to the number of slots of a single sub-channel. Depending upon the order of modulation and coding of the symbols, varying numbers of bytes can fit within the 5 slots of a single sub-channel.

FIG. 4 is a table showing modulation and coding selection (MCS) scheme, bytes per symbol slot, and the corresponding number of bytes that can be transmitted in five uplink slots. As shown, an MCS scheme QPSK, 1/12 coding allows for 1 byte per slot, or 5 bytes for the 5 slots. An MCS scheme QPSK, 1/8 coding allows for 1.5 bytes per slot, or 7.5 bytes for the 5 slots. An MCS scheme QPSK, 1/4 coding allows for 3.0 bytes per slot, 15 bytes for the 5 slots. An MCS scheme QPSK, 1/2 coding allows for 6.0 bytes per slot, 30 bytes for the 5 slots. An MCS scheme QPSK, 3/4 coding allows for 9.0 bytes per slot, 45 bytes for the 5 slots. An MCS scheme 16-QAM, 1/2 coding allows for 12.0 bytes per slot, 60 bytes for the 5 slots. An MCS scheme 16-QAM, 3/4 coding allows for 18.0 bytes per slot, 90 bytes for the 5 slots. An MCS scheme 64-QAM, 1/2 coding allows for 18.0 bytes per slot, 90 bytes for the 5 slots. An MCS scheme 16-QAM, 1/2 coding allows for 12.0 bytes per slot, 60 bytes for the 5 slots. The MCS schemes that include fewer than 30 bytes per 5 slots probably cannot transmit a single MAC PDU within a single sub-channel of an 802.16 uplink frame. Therefore, without modification of the size of the standard MAC PDU, the subscriber may not be able to complete a link with a base station if the quality of the link is poor enough to require the MCS scheme to be QPSK, 1/12 coding because the MAC PDU may be too large to fit within a single sub-channel of the uplink frame.

Figure 5:
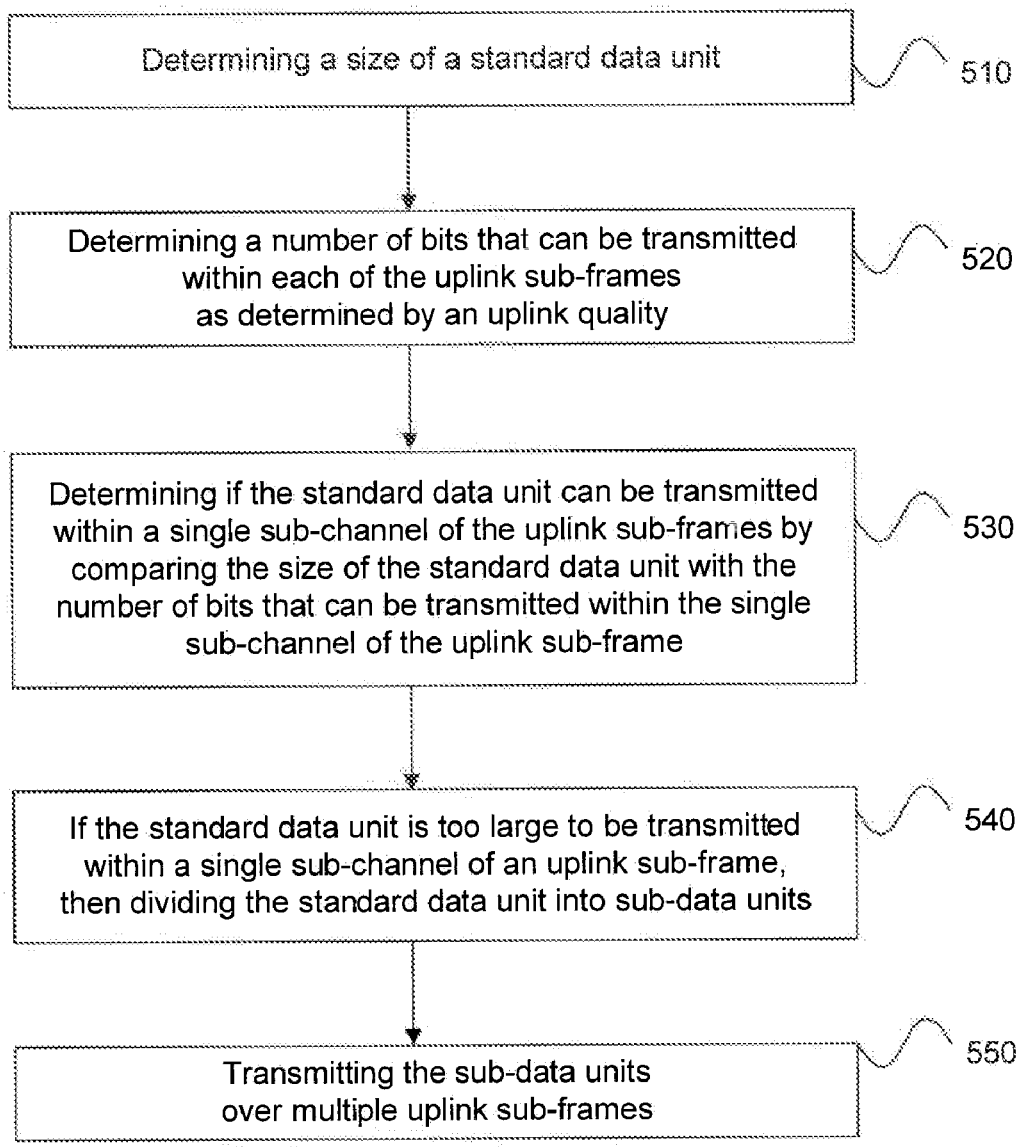
FIG. 5 is a flow chart that includes steps of one embodiment of a method a wireless subscriber scheduling and transmitting uplink packets within uplink sub-frames of a wireless system.

FIG. 5 is a flow chart that includes steps of one embodiment of a method of a wireless subscriber scheduling and transmitting uplink packets within uplink sub-frames of a wireless system. A first step 510 includes determining a size of a standard data unit. A second step 520 includes determining a number of bits that can be transmitted within each of the a plurality of slots contained within a single sub-channel as determined by an uplink quality. A third step 530 includes determining if the standard data unit can be transmitted within a single sub-channel of the uplink sub-frames by comparing the size of the standard data unit with the number of bits that can be transmitted within sub-channel of the uplink frame based on the determined number of bits capable of being transmitted within each slot. If the standard data unit is too large to be transmitted within a single sub-channel of an uplink sub-frame, then a fourth step 540 includes dividing the standard data unit into sub-data units. A fifth step 550 includes transmitting the sub-data units over multiple uplink sub-frames.

Standard Data Unit

The size of the standard data unit is generally determined by a communications protocol standard, such as, the WiMAX standard in which the standard data unit is a WiMAX standard MAC PDU. For one embodiment of a wireless system, the size of a standard data unit is received from an upstream base station. Another embodiment includes the subscriber calculating the size.

Number of Bits Transmitted within a Sub-Channel of an Uplink Sub-Frame

Generally, the number of bits that can be transmitted within a single sub-channel of an Uplink Sub-frame is dependent upon the quality of the uplink, and the number of symbols that can be included within an uplink sub-frame. Additionally, transmission channel bandwidth restrictions influence the number of bits.

For an embodiment, determining a number of bits that can be transmitted within the single sub-channel of the uplink sub-frame includes determining SINR of signals transmitted through the uplink, determining an uplink modulation format based on the SINR, and calculating the number of bits that can be transmitted within the uplink sub-frame based on the uplink modulation format and a number of available symbol slots within the uplink sub-frame, then dividing by the total number of sub-channels within the sub-frame. Generally, the base station provides the number of slots per sub-frame. The number of bits within each transmitted symbol is dependent upon the SINR of signals transmitted through the link. That is, the better the SINR, the higher the possible order of modulation of the symbols.

Therefore, knowing the SINR and the number of available time slots per sub-frame allows determination of the number of bits per sub-channel. Once the number of bits per sub-channel has been determined, and the size (number of bits) of a standard data unit has been determined, a determination of how to divide the standard data unit into sub-data units can be made. More specifically, once the number of bytes that can be transmitted in each uplink sub-frame sub-channel has been determined, the number of sub-data units can be determined by dividing the size of the standard data unit by the number of bytes that can be transmitted in each uplink sub-frame sub-channel.

Encoding of the Sub-data Units

Generally, there are two embodiments for encoding the sub-data units. A first embodiment includes dividing the standard data units into sub-data units, and then encoding each of the individual sub-data units. A second embodiment includes encoding the standard data units before dividing them up into sub-data units. Either way, the encoding adds additional bits for transmission.

If a standard data unit is determined to be too large for a single sub-channel of an uplink frame, and the standard data unit is divided into sub-data units, the sub-data units can be transmitted over multiple uplink frames, or over multiple channels of a single frame. Each approach has advantages and disadvantages. Transmitting over multiple frames can allow for transmission over a single sub-channel, which can be advantageous over multiple sub-channels because the transmission power is limited by an average power level. Therefore, by transmitting over a narrower frequency band, the transmission power per sub-carrier can be greater than transmitting over a wider frequency band. Additional increases in transmission power per sub-carrier can be achieved by dividing the standard sub-channels into mini-sub-channels. Generally, the reduced bandwidth of a mini-sub-channel allows for an increase in SNR, and therefore, an increase in the order of modulation of the transmitted signals.

An embodiment includes dividing the sub-channel in to mini-sub-channels, and determining how many bytes can be transmitted within an uplink sub-frame of each mini-subchannel. The standard units can be divided into sub-data units, wherein a size of the sub-data units is dependent on many bytes can be transmitted within a mini-sub-channel uplink sub-frame. Depending upon the size of the standard data unit and how many bytes can be transmitted within an uplink sub-frame of each mini-sub-channel, the sub-data units are transmitted over multiple uplink sub-frames, over mini-sub-channels.

Each sub-data unit can include at least one indicator bit for aiding the base station in reconfiguring the standard data units from the sub-data units. One embodiment of the indicator bits indicates whether the standard data unit of the sub-data unit starts in a present transmission burst and continues into a next transmission burst, the standard data unit of the sub-data unit continues from a previous transmission burst and continues into a next transmission burst, or the standard data unit of the sub-data unit continues from a previous transmission burst and ends within the present transmission burst. Generally, a burst can be defined as a continuous set of time and frequency slots as determined by a transmission scheduler.

Communication Diversity

Transmission diversity of several forms can be achieved by dividing the standard data units into sub-data units. Spreading the sub-data units over multiple uplink frames provides time diversity. Spreading the sub-data units over multiple sub-channels or over multiple mini-sub channels provides frequency diversity. The subscriber units can include multiple antennas. Therefore, spatial diversity can be achieved by transmitting sub-data units of a standard data unit over different antennas. That is, each of the sub-data units of successive uplink sub-frames can be transmitted through different of the multiple antennas. For a given uplink sub-frame, the sub-data units can be simultaneously transmitted over multiple of the different antennas, and therefore, transmission can be over different multiple antennas for successive uplink sub-frames. Alternative or additional spatial diversity includes the subscriber transmitting to multiple base stations. The multiple base stations coordinate their reception to recombine the sub-data units back into standard protocol data units.

For another embodiment the subscriber determines whether each sub-data unit is received by a base station. If the subscriber determines that a sub-data unit is not received by the base station, the subscriber increases a transmission power level of one or more subsequently transmitted sub-data units.

Figure 6:
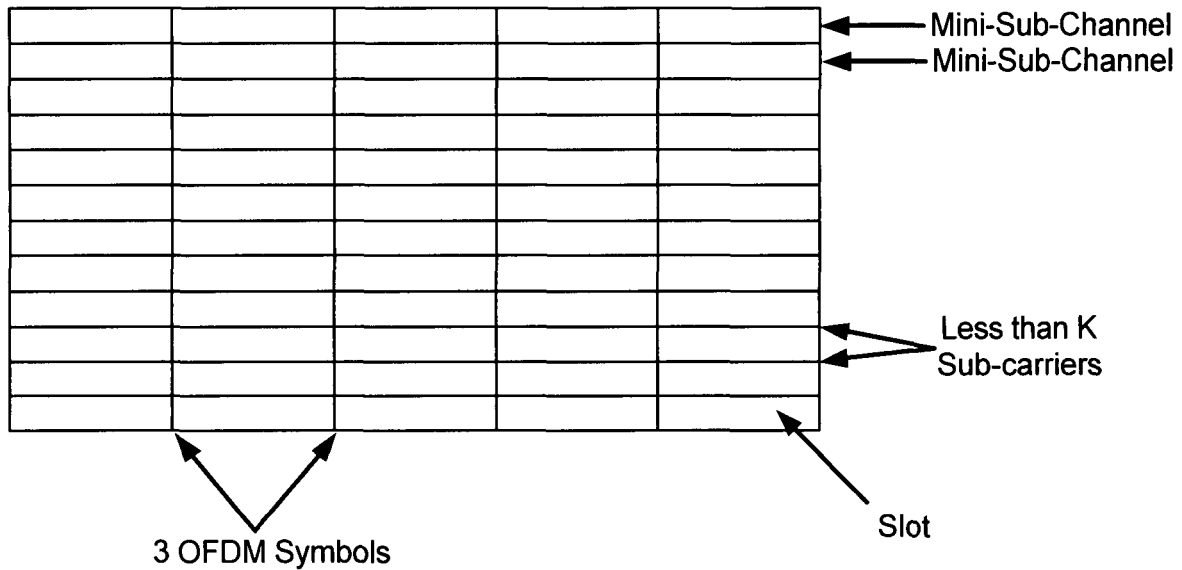
FIG. 6 shows an uplink frame that includes mini-sub-channels.

FIG. 6 shows an uplink frame that includes mini-sub-channels. Dividing the sub-channels into smaller bandwidth mini-sub-channels allows for an increase in the transmission power level of the subscriber. As shown, each min-sub-channel includes fewer than k sub-carriers. Due to the possible increase in transmission power, a power amplifier used for transmission of the sub-data units over the mini-sub-channels can reduce its power back-off.

Figure 7:
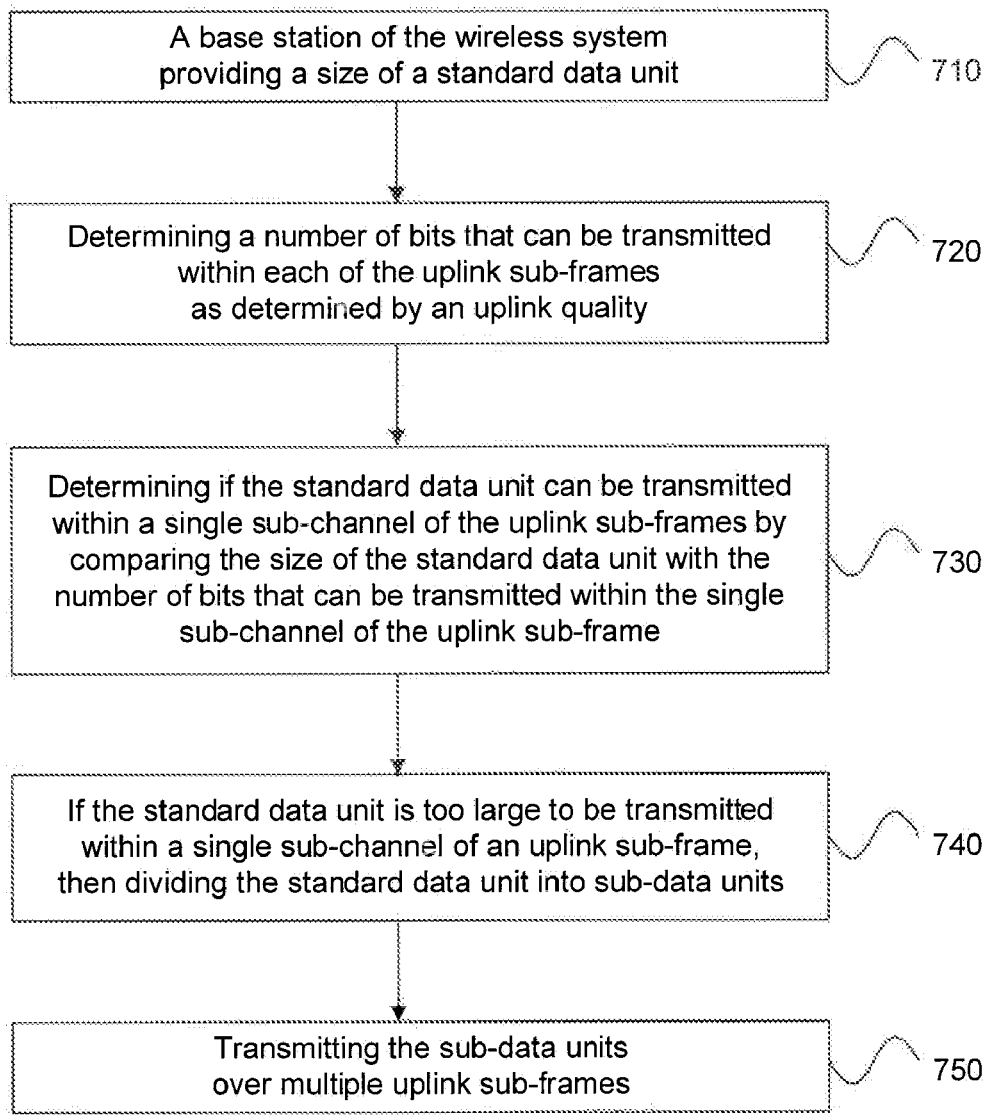
FIG. 7 is a flow chart that includes steps of one embodiment of a method of a wireless system scheduling and transmitting uplink packets within uplink sub-frames of a wireless system

FIG. 7 is a flow chart that includes the steps of another embodiment of a wireless system scheduling and transmitting uplink packets within uplink sub-frames of a wireless system. A first step 710 includes a base station of the wireless system providing a size of a standard data unit. A second step 720 includes determining a number of bits that can be transmitted within each of a plurality of slots contained within a single sub-channel as determined by an uplink quality. A third step 730 includes determining if the standard data unit can be transmitted within a single sub-channel of the uplink sub-frames by comparing the size of the standard data unit with the number of bits that can be transmitted within the sub-channel of the uplink frame based on the determined number of bits capable of being transmitted within each slot. If the standard data unit is too large to be transmitted within a single sub-channel of an uplink sub-frame, then a fourth step 740 includes dividing the standard data unit into sub-data units. A fifth step 750 includes a subscriber unit transmitting the sub-data units over multiple uplink sub-frames.

For an embodiment of a wireless system, the base station schedules transmission of the sub-protocol data units, by specifying sub-channels and time slots of multiple uplink sub-frames. According to the schedule, the base station receives and buffers the sub-data units. The based then re-combines the sub-data units re-forming the standard data units. This can include each sub-data unit being transmitted using HARQ. Each sub-data unit is retransmitted when the base station transmits a NAK for the sub-data unit, and the base station reassembling the sub-protocol data units back into standard data units.

Multiple Uplink Base Stations

Additional or alternative spatial diversity can be obtained by having multiple base stations receiving sub data units transmitted by the subscriber. The multiple base stations reconfigure the sub data units to obtain the original standard data units. For example, one embodiment includes the base station and a second base station simultaneously receiving sub-data units from the subscriber, coordinating reception of the base station and the second base station, and reconfiguring the sub-data units forming the original standard data units. For another embodiment, the base station and the second base station receive different sub-data units.

Figure 8:
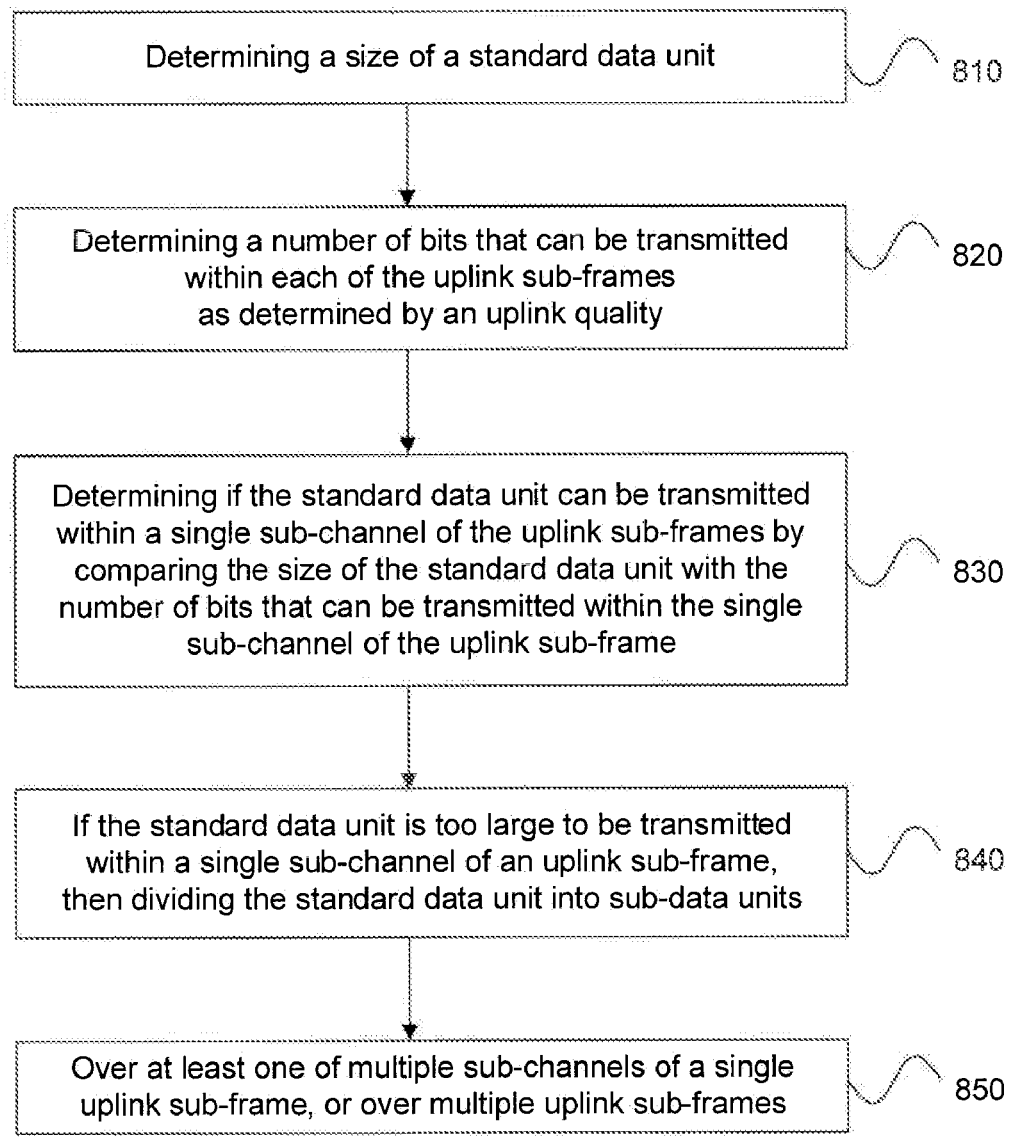
FIG. 8 is a flow chart that includes the steps of another embodiment of a method a wireless subscriber scheduling and transmitting uplink packets within uplink sub-frames of a wireless system.

FIG. 8 is a flow chart that includes the steps of another embodiment of a method a wireless subscriber scheduling and transmitting uplink packets within uplink sub-frames of a wireless system. A first step 810 includes determining a size of a standard data unit. A second step 820 includes determining if the standard data unit can be transmitted within a single sub-channel of an uplink sub-frame by comparing the size of the standard data unit with a number of bits that can be transmitted within the sub-channel of the uplink sub-frame as determined by an uplink quality. If the standard data unit is too large to be transmitted within a single sub-channel of an uplink sub-frame, then a third step 830 includes dividing the standard data unit into sub-data units. A fourth step 840 includes transmitting the sub-data units over at least one of multiple sub-channels of a single uplink sub-frame, or over multiple uplink sub-frames.

Depending upon whether the wireless subscriber is transmission power limited or processing power limited, the sub-data units can be spread over multiple sub-channels or over multiple sub-frames. If the subscriber is power consumption limited, then the sub-data units can be transmitted over multiple sub-channels of a single uplink sub-frame. If the subscriber is transmission power limited, then the sub-data units can be transmitted over multiple uplink sub-frames.

Although specific embodiments have been described and illustrated, the embodiments are not to be limited to the specific forms or arrangements of parts so described and illustrated. The embodiments are limited only by the appended claims.

What is claimed:

1. A method of a wireless subscriber scheduling and transmitting of uplink packets within uplink sub-frames of a wireless system, comprising:

determining a size of a standard data unit;

determining if the standard data unit can be transmitted within a single sub-channel of an uplink sub-frame by comparing the size of the standard data unit with a number of bits that can be transmitted within the single sub-channel of the uplink sub-frame; and if the size of the standard data unit exceeds the number of bits that can be transmitted within the single sub-channel of the uplink sub-frame, then:
  dividing the sub-channel into mini-sub-channels;
  determining how many bytes can be transmitted within each mini-sub-channel within the uplink sub-frame;
  dividing the standard data unit into sub-data units, where a size of the sub-data units is dependent on how many bytes can be transmitted within each mini-sub-channel of the uplink sub-frame;
  transmitting the sub-data units over multiple uplink sub-frames; and
  reducing power back-off of a power amplifier used for transmission of the sub-data units transmitted over the mini-sub-channels.

2. The method of claim 1, wherein determining a size of a standard data unit comprises receiving the size from an upstream base station.

3. The method of claim 1, wherein determining a size of a standard data unit comprises the subscriber calculating the size.

4. The method of claim 1, wherein the standard data unit is a WiMAX standard MAC PDU.

5. The method of claim 1, wherein the determining the number of bits that can be transmitted within the single sub-channel of the uplink sub-frame further comprises:
  determining SINR of signals transmitted through the uplink;
  determining an uplink modulation format based on the SINR;
  calculating the number of bits that can be transmitted within the single sub-channel of the uplink sub-frame based on the uplink modulation format and a number of available symbol slots within the uplink sub-frame.

6. The method of claim 1, wherein dividing the standard data unit into sub-data units comprises:
  dividing the size of the standard data unit by the number of bytes that can be transmitted in each mini-sub-channel.

7. The method of claim 1, wherein dividing the standard data unit comprises dividing each standard data unit and encoding each sub-data unit.

8. The method of claim 1, wherein dividing the standard data unit comprises encoding each standard data unit, and dividing the encoded standard data units into sub encoded data units.

9. The method of claim 1, wherein transmitting the sub-data units over multiple uplink sub-frames comprises transmitting the sub-data units over multiple uplink sub-frames, over mini-sub-channels.

10. The method of claim 1, wherein each sub-data unit comprises at least one indicator bit, the indicator bit indicating whether the standard data unit of the sub-data unit starts in a present transmission burst and continues into a next transmission burst, the standard data unit of the sub-data unit continues from a previous transmission burst and continues into a next transmission burst, or the standard data unit of the sub-data unit continues from a previous transmission burst and ends within the present transmission burst.

11. The method of claim 1, wherein the subscriber comprises multiple antennas, and the method further comprises transmitting sub-data units of successive uplink sub-frames through different of the multiple antennas.

12. The method of claim 1, further comprising:
  the subscriber determining whether each sub-data unit is received by a base station;
  the subscriber increasing a transmission power level of one or more subsequently transmitted sub-data units if a sub-data unit is not received by the base station.

13. A method of a wireless system scheduling and transmitting of uplink packets within uplink sub-frames of a wireless system, comprising:
  receiving, from a base station of the wireless system, a size of a standard data unit;
  determining if the standard data unit can be transmitted within a single sub-channel of an uplink sub-frame by comparing the size of the standard data unit with the number of bits that can be transmitted within the single sub-channel of the uplink sub-frame; and
  if the size of the standard data unit exceeds the number of bits that can be transmitted within the single sub-channel of the uplink sub-frame, then:
    dividing the sub-channel in to mini-sub-channels;
    determining how many bytes can be transmitted within each mini-sub-channel within the uplink sub-frame;
    dividing the standard data unit into sub-data units, where a size of the sub-data units is dependent on how many bytes can be transmitted within each mini-sub-channel of the uplink sub-frame;
    a subscriber unit transmitting the sub-data units over multiple uplink sub-frames; and
    reducing power back-off of a power amplifier used for transmission of the sub-data units transmitted over the mini-sub-channels.

14. The method of claim 13, further comprising:
  recognizing, at the base station, that it is receiving sub-data units and that subsequent sub-data unit will be subsequently received;
  allocating, at the base station, bandwidth to the subscriber for the subsequent sub-data units by scheduling transmission of the sub-protocol data units, specifying sub-channels and time slots of multiple uplink sub-frames.

15. The method of claim 13, further comprising:
  receiving the sub-data units at the base station;
  buffering the sub-data units at the base station;
  re-combining the sub-data units re-forming the standard data units at the base station.

16. The method of claim 13, wherein each sub-data unit is transmitted using HARQ, further comprising retransmitting each sub-data unit when the base station transmits a NAK for the sub-data unit, and the base station reassembling the sub-protocol data units back into standard data units.

17. The method of claim 13, further comprising the base station and a second base station simultaneously receiving sub-data units from the subscriber, coordinating reception of the base station and the second base station, and reconfiguring the sub-data units forming the original standard data units.

18. The method of claim 17, wherein the base station and the second base station receive different sub-data units.

19. A method of a wireless subscriber scheduling and transmitting of uplink packets within uplink sub-frames of a wireless system, comprising:
  determining a size of a standard data unit;
  determining if the standard data unit can be transmitted within a single sub-channel of an uplink sub-frame by comparing the size of the standard data unit with a number of bits that can be transmitted within the single sub-channel of the uplink sub-frame as determined by an uplink quality; and
  if the standard data unit is too large to be transmitted within the single sub-channel of the uplink sub-frame, then:
    dividing the sub-channel in to mini-sub-channels;

determining how many bytes can be transmitted within each mini-sub-channel within the uplink sub-frame;

dividing the standard data unit into sub-data units, where a size of the sub-data units is dependent on how many bytes can be transmitted within each mini-sub-channel of the uplink sub-frame;

transmitting the sub-data units over at least one of the mini-sub-channels of a single uplink sub-frame, and over multiple uplink sub-frames; and reducing power back-off of a power amplifier used for transmission of the sub-data units transmitted over the mini-sub-channels.

20. The method of claim 19, further comprising:

determining if the subscriber is power consumption limited, or transmission power limited.

21. The method of claim 19, wherein if the subscriber is power consumption limited, then transmitting the sub-data units over multiple mini-sub-channels of a single uplink sub-frame.

22. The method of claim 19, wherein if the subscriber is transmission power limited, then transmitting the sub-data units over a single mini-sub-channel of multiple uplink sub-frames.

* * * * *

UNITED STATES PATENT AND TRADEMARK OFFICE
CERTIFICATE OF CORRECTION

| | | |
|---|---|---|
| PATENT NO. | : 8,284,703 B2 | |
| APPLICATION NO. | : 11/804201 | |
| DATED | : October 9, 2012 | |
| INVENTOR(S) | : Puri et al. | |

It is certified that error appears in the above-identified patent and that said Letters Patent is hereby corrected as shown below:

Column 6, line 60, please replace "of uplink" with --uplink--.

Column 7, Line 64, please replace "different of" with --different ones of--.

Column 8, line 5, please replace "of uplink" with --uplink--.

Column 8, Line 18, please replace "in to" with --into--.

Column 8, line 32, please replace "unit" with --units--.

Column 8, line 56, please replace "of uplink" with --uplink--.

Column 8, Line 67, please replace "in to" with --into--.

Signed and Sealed this
Nineteenth Day of March, 2013

Teresa Stanek Rea
*Acting Director of the United States Patent and Trademark Office*